(12) United States Patent
Pijls (10) Patent No.: US 9,981,407 B2
(45) Date of Patent: May 29, 2018

(54) PREFORMS AND PROCESSES FOR MAKING BAG IN BOTTLE CONTAINERS

(71) Applicant: The Procter & Gamble Company, Cincinnati, OH (US)

(72) Inventor: Stefaan Ghislain Edgar Claire Pijls, Keerbergen (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days. days.

(21) Appl. No.: 15/160,183

(22) Filed: May 20, 2016

(65) Prior Publication Data
US 2016/0375608 A1    Dec. 29, 2016

(30) Foreign Application Priority Data

Jun. 29, 2015  (EP) ..................................... 15174199
Apr. 14, 2016  (EP) ..................................... 16165318

(51) Int. Cl.
*B65D 1/02* (2006.01)
*B29B 11/08* (2006.01)
(Continued)

(52) U.S. Cl.
CPC .............. *B29B 11/08* (2013.01); *B29B 11/14* (2013.01); *B29C 45/1675* (2013.01);
(Continued)

(58) Field of Classification Search
CPC ..... B29B 11/08; B29B 11/14; B29C 45/1675; B29C 45/44; B29C 45/4421; B29C 49/12;
(Continued)

(56) References Cited

U.S. PATENT DOCUMENTS 2,608,320 A   8/1952  Harrison, Jr.
4,842,165 A   6/1989  Van Coney
(Continued)

FOREIGN PATENT DOCUMENTS

CA    CA 2509336 A1 * 11/1993  .............. B65D 1/02
EP    1 593 605 A1    11/2005
(Continued)

OTHER PUBLICATIONS

Extended European Search Report for Application No. 16165318.3-1706, dated Oct. 25, 2016, 6 pages.
(Continued)

*Primary Examiner* — Robert J Hicks
(74) *Attorney, Agent, or Firm* — Gary J. Foose (57) ABSTRACT

A preform including a preform neck; a preform body extending from the neck; and a preform end cap extending from the preform body; wherein the body and end cap have: an inner layer having an inner layer inner surface and an inner layer outer surface; an outer layer having an outer layer inner surface and an outer layer outer surface; wherein the inner layer is positioned interior to the outer layer, characterized in that outer layer in the end cap have an interlock, wherein the interlock includes a stem and a head extending from the stem, the interlock being connected to the outer layer inner surface by the stem, such that the inner layer and outer layer are connected in the end cap by the interlock.

13 Claims, 8 Drawing Sheets

(51) Int. Cl.
*B29B 11/14* (2006.01)
*B29C 49/12* (2006.01)
*B29C 49/64* (2006.01)
*B29C 49/70* (2006.01)
*B29C 45/16* (2006.01)
*B29L 31/00* (2006.01)
*B29C 45/44* (2006.01)
*B29C 49/06* (2006.01)
*B29C 49/22* (2006.01)
*B65D 77/06* (2006.01)
*B29L 9/00* (2006.01)

(52) U.S. Cl.
CPC .............. *B29C 49/12* (2013.01); *B29C 49/64* (2013.01); *B29C 49/70* (2013.01); *B65D 1/0215* (2013.01); *B29B 2911/1402* (2013.01); *B29B 2911/1408* (2013.01); *B29B 2911/1414* (2013.01); *B29B 2911/14093* (2013.01); *B29B 2911/14113* (2013.01); *B29B 2911/14486* (2013.01); *B29C 45/44* (2013.01); *B29C 45/4421* (2013.01); *B29C 49/06* (2013.01); *B29C 49/221* (2013.01); *B29L 2009/001* (2013.01); *B29L 2031/7128* (2013.01); *B29L 2031/7158* (2013.01); *B65D 1/02* (2013.01); *B65D 1/0261* (2013.01); *B65D 77/06* (2013.01)

(58) Field of Classification Search
CPC ......... B29C 49/64; B29C 49/70; B29C 49/06; B29C 49/221; B65D 1/0215; B65D 1/0207; B65D 1/02; B65D 1/40; B65D 77/06; B65D 25/14
USPC ............. 215/370, 371, 379, 12.1; 220/62.12, 220/62.22, 626, 62.21; 428/36.92, 35.7; 264/510, 512
See application file for complete search history.

(56) References Cited

U.S. PATENT DOCUMENTS

| | | | |
|---|---|---|---|
| 6,467,653 | B1 | 10/2002 | Hamamoto et al. |
| 6,649,121 | B1 * | 11/2003 | Hamamoto ......... B29C 37/0085 264/255 |
| 2006/0054635 | A1 | 3/2006 | Iwahashi et al. |
| 2008/0257847 | A1 * | 10/2008 | Van Hove ............... B29C 49/06 215/12.1 |
| 2010/0028030 | A1 | 2/2010 | Maekawa |
| 2011/0024450 | A1 | 2/2011 | Maas et al. |
| 2012/0187067 | A1 | 7/2012 | Maas et al. |

FOREIGN PATENT DOCUMENTS

| | | |
|---|---|---|
| JP | 5 999 553 B2 | 9/2016 |
| WO | WO 2008/129015 A1 | 10/2008 |
| WO | WO 2008/129016 A1 | 10/2008 |
| WO | WO 2012/083310 A2 | 6/2012 |

OTHER PUBLICATIONS

International Search Report for International Application Serial No. PCT/US2016/038286, dated Sep. 15, 2016, 12 pages.

* cited by examiner

PREFORMS AND PROCESSES FOR MAKING BAG IN BOTTLE CONTAINERS

FIELD OF THE INVENTION

The present invention relates to blow molding and dispensing technologies, and in particular to novel preforms and processes for making bag in bottle containers and delivery systems.

BACKGROUND OF THE INVENTION

When products are dispensed from a container, such as a bottle, air is entrained into the bottle. The result is a reduced product quality due to oxidation, bacterial contamination, loss of volatiles, and the like. Moreover, dispensing of highly viscous products is challenging for standard containers, and often results in non-dispensed residues. Hence, bag-in-bottle type containers have been developed in order to limit air entrainment into the bottle, and enable dispensing of higher viscosity liquids to virtually the last drop.

Typically, such bag-in-bottle containers comprise an outer bottle and an inner flexible bag. The outer bottle typically includes a resilient side wall portion. When dispensing via squeezing, pumping, and the like, product from the bag is forced through a dispensing passage, as the inner product bag is collapsed under pressure. The inner bag preferably collapses while maintaining a passage for the product contained therein, to the opening, such that product is not trapped in the inner bag, as the inner bag collapses. Typically, this is achieved by connecting the inner bag to a resilient outer bottle with at least one interlock. An interlock is typically located at the bottom of the bottle, in order to avoid product entrapment, but also to hide the interlock and reduce its impact on the aesthetic form of the bottle.

Such bag-in-bottle containers are typically made via stretch blow-moulding of a preform. In order to blow-mould such preforms, the preform is typically heated such that the preform can be formed to the desired shape. However, during the heating and blowing process, the interlock must be kept cold, in order to avoid damage and deformation of the interlock, or even separation of the inner and outer layers at the interlock. For instance, in WO2012/083310 A2, heating elements are positioned in order to heat the preform sides, but not where the valve is positioned. In addition, heat shielding is typically placed around the interlock, or air is blown on the interlock, in order to limit the temperature increase of the interlock. Since the interlock has to be kept cool during the blowing process, such preforms cannot be blown in standard blow-moulding machines, without significant modification to the blow-moulding machine.

Therefore, a need remains for a preform for bag-in-bottle containers, which can be formed into the container without requiring complex processes or machine changes, and to avoid damage to the interlock.

WO2012/083310, U.S. Pat. No. 2,608,320, U.S. Pat. No. 4,842,165 and WO2008129016 disclose bag-in-bottle containers, preforms for making them, and processes for converting such preforms into containers.

SUMMARY OF THE INVENTION

The present invention relates to a preform comprising: a preform neck, a preform body; and a preform end cap, wherein the body and end cap comprise an inner layer comprising an inner layer inner surface and an inner layer outer surface, an outer layer comprising an outer layer inner surface and an outer layer outer surface, characterised in that outer layer in the end cap comprises an interlock, wherein the interlock comprises a stem and a head, the interlock being connected to the outer layer inner surface by the stem, such that the inner layer and outer layer are connected in the end cap by the interlock and wherein at least part of the stem (41) and head (42) of the interlock (40) is embedded into the inner layer (10).

The present invention further relates to a bottle formed by blow-moulding the preform.

The present invention further relates to a process for making the preform, comprising the steps of: forming a first cavity between a preform mould and a first core, wherein the first core comprises the interlock mould-portion, injecting a resin into the first cavity to form the outer layer and the interlock stem and head, leaving the outer layer and interlock stem and head in the preform mould, while replacing the first core with a second core, to form a second cavity between the outer layer and the second core, injecting resin into the second cavity to form the inner layer and form the interlock.

DETAILED DESCRIPTION OF THE INVENTION

A preform for forming bag-in-bottle containers while ensuring that the interlock remains intact, without requiring complex processing or heat protection machine changes, can be made by connecting the interlock to the inner surface of the outer layer.

The term "container" as used herein refers to any hollow article, usually obtained by blow-moulding. The containers of the present invention are suitable for use as a container for any kind of matter, but preferably for liquids or other compositions which are fluid. The term container does not imply a particular intended use for the article. For example, the term "container" as used herein encompasses articles destined to contain cosmetic products (e.g. shampoos, creams, etc), edible products (e.g. milk, soft drink, condiments, etc), chemicals, etc. The preforms and containers of the present invention can be practical for laundry, household care, and personal care bottles.

The Preform:

Preforms comprise a preform neck (50), a preform body (60), and preform end cap (70). During injection stretch blow moulding of the preform, the preform neck (50) remains substantially undeformed, while the preform body (60) and preform end cap (70) are deformed to form the container body and base. The preform end cap (70) refers to the typically curved portion at the base of the preform (1). The preform body (60) and preform end cap (70) comprise an inner layer (10) and an outer layer (20). These layers can be separately moulded, and then later brought together and attached at the interlock (40).

More preferably, the preform is injection moulded in a single process, with an initial layer being moulded, and the second layer being moulded in connection to the initial layer. Where the inner container must be sealed to the outer container so that there is no leakage of any liquid from the inner container, and so that said liquid does not contact ambient air or any surroundings, such single processes are preferred. Such processes are exemplified in FIGS. 4 and 5. A first cavity (200) can be formed by inserting a first core (300) into a preform mould (100). The first core (300) can comprise an interlock mould portion (310) which forms the interlock (40) during injection moulding. The outer layer (20) and interlock stem (41) and interlock head (42) are then formed by injecting a resin into the first cavity (200). The first core (300) can then be removed, while leaving the outer layer (20) and interlock stem (41) and head (42) in the preform mould (100). A second cavity (400) can be formed by inserting a second core (500) into the preform mould (100). The inner layer (10) can then be formed by injecting a resin into the second cavity (400). The interlock (40) is formed as the resin solidifies around the interlock stem (41) and head (42).

In an alternative process, the inner layer (10) can be formed first. In such processes, the preform mould (100) is removed and replaced with a second preform mould, in order to form the second cavity, into which the outer-layer is formed by injecting a resin.

The preform neck (50) can be formed by providing a neck cavity (700), formed between a neck insert (600) and core (300 or 500). The preform neck (50) can be co-formed with the outer-layer (20) or with the inner layer (10). For instance, where the first cavity (200) and neck cavity (700) are present together, and the outer layer (20) is formed by injecting a resin into the first cavity (200), the preform neck (50) and outer layer (20) are formed together. Where the inner layer (10) is formed by injecting a resin into the first cavity (200), the preform neck (50) and inner layer (10) are formed together.

Alternatively, where the second cavity (400) and neck cavity (700) are present together, and the inner layer (10) is formed by injecting a resin into the second cavity (400), the preform neck (50) and inner layer (10) are formed together. Where the outer layer (20) is formed by injecting a resin into the second cavity (400), the preform neck (50) and outer layer (20) are formed together.

The inner layer (10) and outer layer (20) of the preform (1) is preferably made using thermoplastic material. Any suitable thermoplastic material may be useful herein. Such thermoplastic materials may include normally solid polymers and resins, including aliphatic mono-1-olefins.

Suitable thermoplastic materials for use in resins to form the inner layer (10) and outer layer (20) include: polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position are preferred. Other suitable thermoplastic materials include the acrylonitrile-butadiene-styrene resins, cellulosics, copolymers of ethylene and a vinyl monomer with an acid group such as methacrylic acid, phenoxy polymers, polyamides, including polyamide-imide (PAI), polyamide-based resins, low-density polyethylene, high-density polyethylene, low-density polypropylene, high-density polypropylene, polyethylene terephthalate, and mixtures thereof.

Particularly preferred thermoplastic materials are those selected from the group consisting of polyolefins and derivatives thereof. More preferably the thermoplastic material is selected from the group consisting of polyethylene, including low-density, but particularly high-density polyethylene, polypropylene, polyesters, polyethylene furanoate (PEF), thermoplastic elastomers from polyolefin blends and mixtures thereof.

Suitable polyesters include: such as polyethylene terephthalate (PET), polyethylene naphthalate (PEN), polytrimethylene terephthalate (PTT), poly(trimethylene naphthalate) (PTN), and mixtures thereof, though polyethylene terephthalate is preferred.

Suitable biodegradable polymers include: polyglycol acetate (PGAc), polylactic acid (PLA); and copolymers and blends thereof.

Preferred thermoplastic materials can be selected from the group consisting of: polyethylene, including low-density, but particularly high-density polyethylene, polypropylene, polyethylene furanoate (PEF), thermoplastic elastomers from polyolefin blends, polyethylene terephthalate (PET), polyethylene naphthalate (PEN), polytrimethylene terephthalate (PTT), poly(trimethylene naphthalate) (PTN), polyglycol acetate (PGAc), polylactic acid (PLA), and mixtures thereof.

The inner layer (10) and outer layer (20) can be made from the same thermoplastic material or different thermoplastic material, depending on the desired use of the resultant bottle.

More preferably, the thermoplastic material used in the resin for forming the inner layer (10) is selected from the group consisting of: polyethylene, including low-density, but particularly high-density polyethylene, polypropylene, and mixtures thereof.

More preferably, the thermoplastic material used in the resin for forming the outer layer (20) is selected from the group consisting of: polypropylene, polyethylene terephthalate (PET), and mixtures thereof.

The product may be formed from a virgin resin, a regrind or recycled resin, petroleum derived resins, bio-derived resins from plant materials, and combinations of such resins. The containers may comprise fillers and additives in addition to the base resin material. Exemplary fillers and additives include colorants, cross-linking polymers, inorganic and organic fillers such as calcium carbonate, opacifiers, and processing aids as these elements are known in the art.

Where two different materials which do not bond together are used to make a preform, such as, PET/PP, the preform can be made by a bi-injection molding process (also known as a "two component" or "2C" process, and so used herein), using the same mould. The outer layer can first be formed, and then the inner layer can be moulded through an injection point, typically located at or in the bottom of the outer preform. By virtue of the bi-injection moulding, the two preforms are then connected to each other at the bottom and at the top. If a preform with both layers comprising the same material is desired, e.g., PET/PET, then the preform can also be made using a 2C process if proper steps are taken to prevent the bonding of the inner container to the outer container, such as the application of a nonstick coating between injections, or selection of material or material thicknesses such that the outer layer does not melt, or additives such as slip agents are included in the resin for the inner layer (10), outer layer (20), or both.

The inner layer (10) and outer layer (20) of the preform (1) are connected at a bottom portion by an interlock (40). The interlock is attached to the outer layer inner surface (21). At least part of the stem (41) and head (42) of the interlock (40) is embedded into the inner layer (10). This can be achieved by moulding the outer layer (20) of the preform, together with the interlock (40), and then moulding the inner layer (10) around the interlock (40) in a subsequent step. By "embedded into the inner layer" is meant herein that a part of the stem (41) and head (42) of the interlock (40) is fixed into the surrounding inner layer (10). The head (42) of the interlock is separated from the outer layer inner surface (21) by the stem (41). The head (42) typically has a radial dimension which is greater than the minimum radial dimension of the stem (41), in order to improve the locking of the inner layer (10) to the outer layer at the interlock (40). A "radial", direction is one which is measured perpendicular to the axial direction which runs through the centreline of the preform (10), from the opening to the bottom.

As a result, the inner layer (10) is connected to the outer layer (20) via the interlock (40), without requiring any modifications to the oven used to heat the preform in the converting process to form the final bag-in-bottle container. As such the preform (1) of the present invention does not require shielding (such as cool air flow, radiation shield, and the like) of the bottom of the preform (1) in the oven.

The stem (41) and head (42) of the interlock (40) are typically formed during injection-moulding of the preform (1). As mentioned earlier, the head (42) typically has a radial dimension which is greater than the minimum radial dimension of the stem (41), such that the inner layer (10) is "locked" to the outer layer at the interlock (40). This difference in radial dimension is typically referred to as an "undercut". The mould is designed such that the stem (41) and head (42) is released from the mould after forming.

Producing moulded preforms (1) with undercuts presents distinct challenges for moulders. Undercuts are protrusions or recessions in a part which can prevent the mould, after the preform (1) is formed, from sliding away along the parting direction (demoulding). These features inhibit the direct removal of the core, and as a result, can necessitate using an additional mould piece, such as a collapsible mould core, a side-core, an internal core lifter, and the like, to form the shape of the interlock (40).

Suitable collapsible mould cores are well known to the skilled person, and include collapsible mini-cores as well as dove-tail collapsible cores. Collapsible cores typically comprise internal threads, slots, undercuts, protrusions or cutouts and incorporate moving parts which can be repositioned after injection moulding, to facilitate the removal of the core from the preform (1).

Alternatively, by limiting the undercut, the difference in size of the head (42) in comparison to the stem (41), the mould core can be pulled out of the outer layer (20) with little or no damage to the stem (41) and head (42) of the interlock. In such cases, the size of the undercut is typically selected based on the choice of materials for the outer layer (20) and inner layer (10), in addition to the overall shape of the inter-lock (40), as is known by the skilled person.

Figure 6:
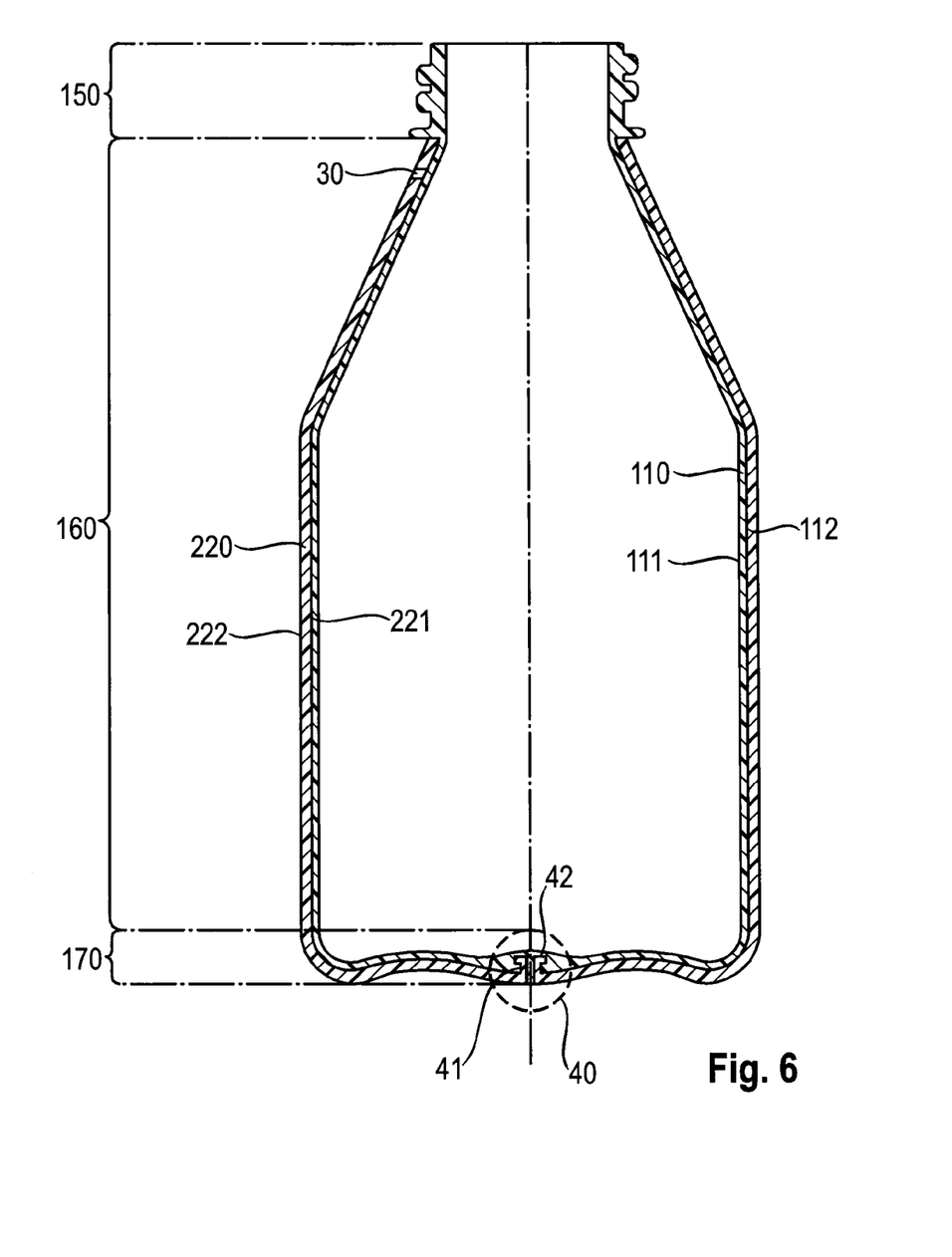
FIG. 6 shows a container (2), comprising a container neck (150), container body (160), and container end cap (170), the container body (160) and container end cap (170) comprising an inner layer (110) and outer layer (220). The inner layer (110) has an inner layer inner surface (111) and an inner layer outer surface (112). The outer layer (220) has an outer layer inner surface (221) and an outer layer outer surface (222). The container (2) further comprises an interlock (40) comprising a stem (41) and a head (42), attached to the outer layer inner surface (21) at the container end cap (170).

The preform of the present invention can be used to form a container (2). Such containers (2) comprise: a container neck (150), a container body (160), and a container end cap (170). The container body (160) and container end cap (170) comprise: an inner layer (110) and an outer layer (220). The inner layer (110) comprises an inner layer inner surface (111) and an inner layer outer surface (112). The outer layer (220) comprises an outer layer inner surface (221) and an outer layer outer surface (222). The inner layer (110) is positioned interior to the outer layer (220). The outer layer (220) in the end cap (170) comprises an interlock (40). The interlock (40) comprises a stem (41) and a head (42). The interlock (40) is connected to the outer layer inner surface (21) by the stem (41), such that the inner layer (110) and outer layer (220) are connected in the end cap (170) by the interlock (40) and wherein at least part of the stem (41) and head (42) of the interlock (40) is embedded into the inner layer (10). Therefore, the interlock is pointing towards the inside of the preform (1).

The bag-in-bottle container can be obtained by providing the preform of the present invention, bringing said preform to the blow-moulding temperature; fixing the heated preform at the level of the neck region with fixing means in the blow-moulding tool; and blow-moulding the heated preform to form the bag-in-bottle container.

The inner layer and outer layer of the bag-in-bottle container are connected to one another at the inner layer outer surface and the outer layer inner surface, in addition to at the interlock.

One or more vents (30) are preferably present, such that the interface between the inner layer outer surface and the outer layer inner surface is in fluid communication with the atmosphere through the vent (30). Where the vent (30) is positioned at or near the preform neck (50), for instance, positioned from 0 mm to 25 mm, preferably from 0 mm to 10 mm, more preferably from 0 mm to 5 mm below the neck (50), the vent (30) is not damaged or deformed when the preform (1) is blown, since the region close to the preform neck (50) undergoes limited or no stretching during blowing.

The vent (30) may comprise a valve, in order to prevent air from escaping from between the inner layer and outer layer. This can be desirable, for instance, in order to prevent refill of the container, and to ensure that a pump-dispenser, if used, remains charged.

The interface (24) between inner and outer layers (21) and (22) should release in a consistent and reproducible manner when gas passes through the vent (30). The success of said operation depends on a number of parameters, in particular, on the interfacial adhesive strength, in addition to the number, geometry, and distribution of the vents. The interfacial strength is of course a key issue and can be modulated by the choice of the material for the inner and outer layers, the thickness of the layers, and by the process parameters during blow-moulding, as is well known to those skilled in the art. The pressure-time-temperature window used is of course of prime importance and greatly depends on the material selected for the inner layer (10) and outer layer (20). As such, the resin for the inner layer (10) and the resin for the outer layer (20) are typically selected to be different. When the same or similar resins are used for the inner layer (10) and outer layer (20), the process parameters during blow-moulding are set such that the interfacial strength between the two layers is sufficiently low that the layers can delaminate during blowing, and/or during use. Alternatively, or in combination, a non-stick agent (release agent) can be applied at the interface between the two layers, or can be added to the resin of the inner layer (10), outer layer (20), or both.

A release agent may be applied at the interface on either or both surfaces of the inner and outer preforms, which are to form the interface of the bag-in-container. Any release agents available on the market and best adapted to the material used for the preform and resisting the blowing temperatures, like silicon- or PTFE-based release agents (e.g., Freekote™) may be used. The release agent may be applied after injecting the resin to form the first layer, and before injecting the resin to form the second layer. More preferably, the release agent is incorporated into the resin used to form the inner layer (10), the outer layer (20), and combinations thereof.

Figure 1:
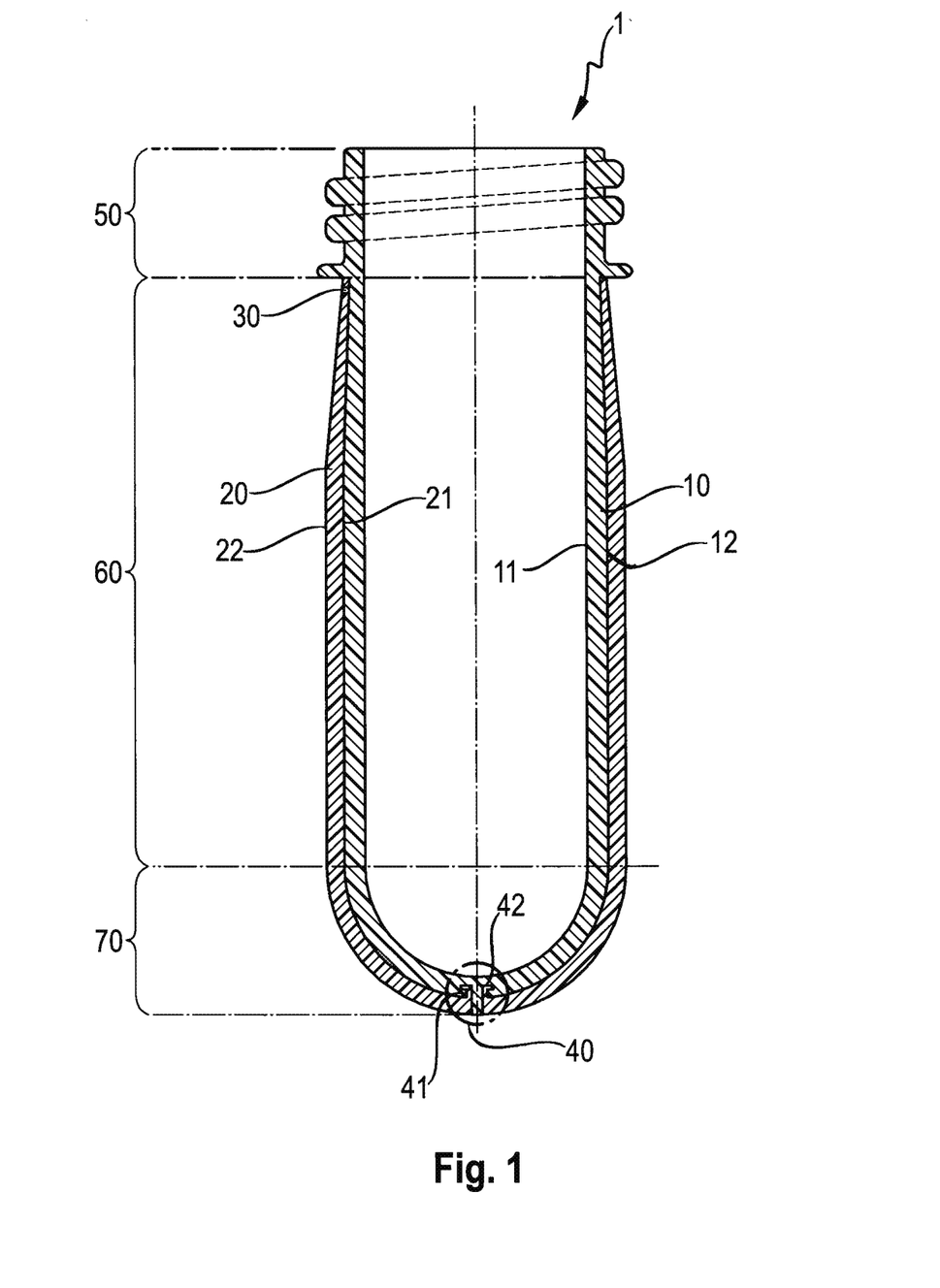
FIG. 1 shows a preform (1), comprising a preform neck (50), preform body (60), and preform end cap (70), the preform body (60) and preform end cap (70) comprising an inner layer (10) and outer layer (20). The inner layer (10) has an inner layer inner surface (11) and an inner layer outer surface (12). The outer layer (20) has an outer layer inner surface (21) and an outer layer outer surface (22). The preform (1) further comprises an interlock (40) comprising a stem (41) and a head (42), attached to the outer layer inner surface (21) at the preform end cap (70). Since the interlock is attached to the outer layer inner surface (21), it is pointing towards the inside of the preform (1).
Figure 2:
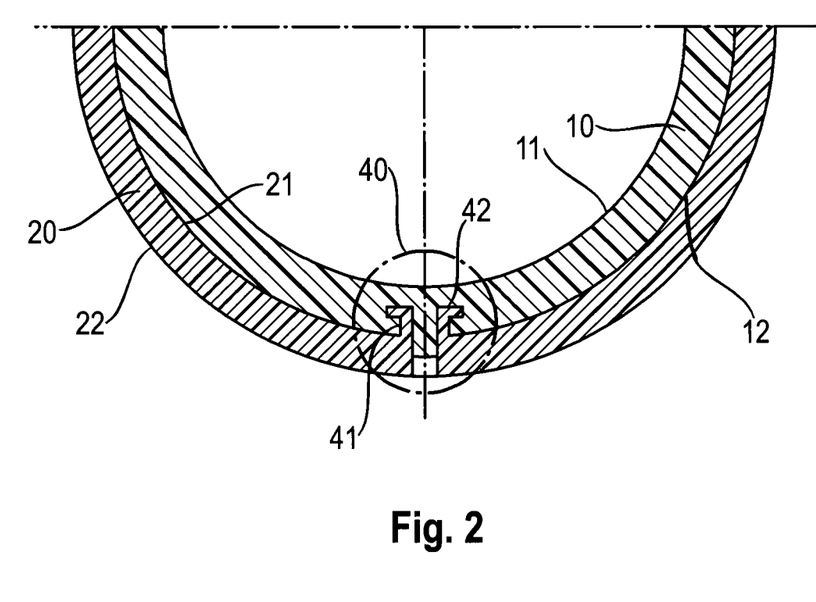
FIG. 2 shows a detail of the interlock (40) of FIG. 1.
Figure 3:
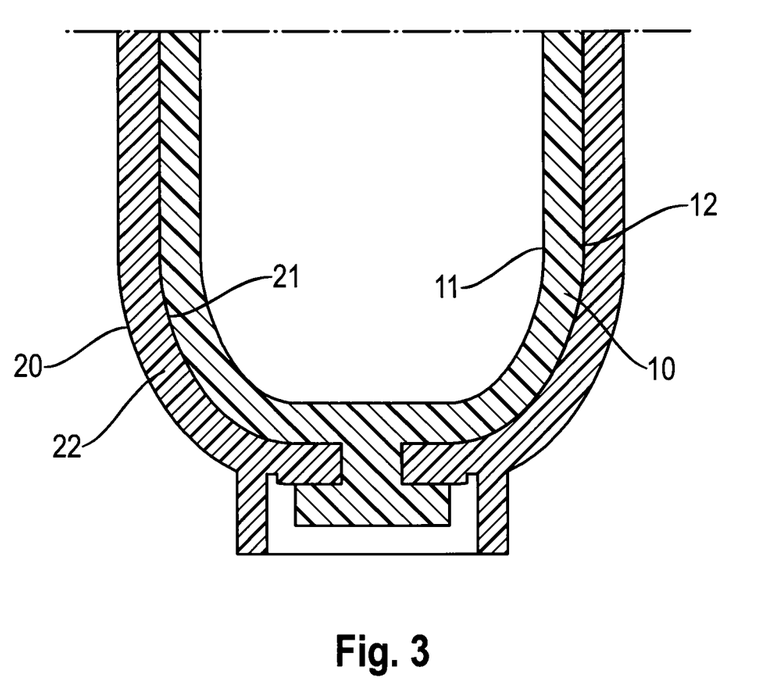
FIG. 3 shows a detail of a comparative bag-in-bottle preform, in which the interlock comprises a protrusion from the innerlayer throughout the outerlayer, anchoring on the outer surface of the outer layer. As a result, interlock is exposed to the heat applied during the blowing process.
Figure 4A:
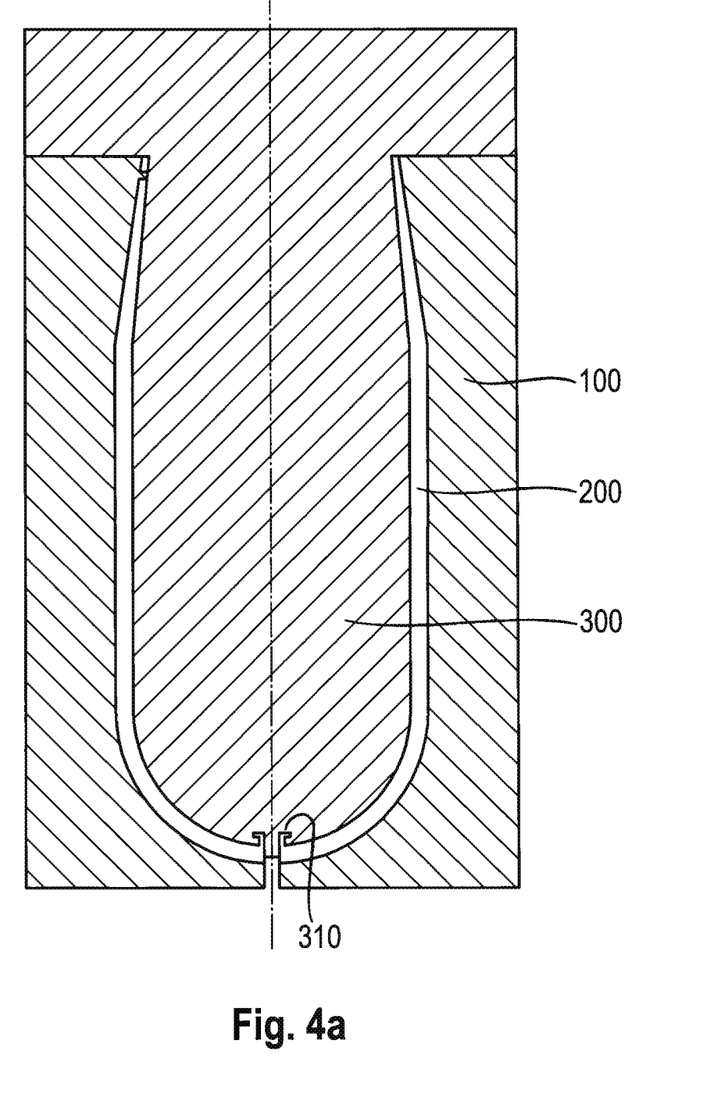
FIG. 4a shows a first cavity (200) formed in the space between the preform mould (100) and first core (300). The first core (300) comprises an interlock mould portion (310).
Figure 4B:
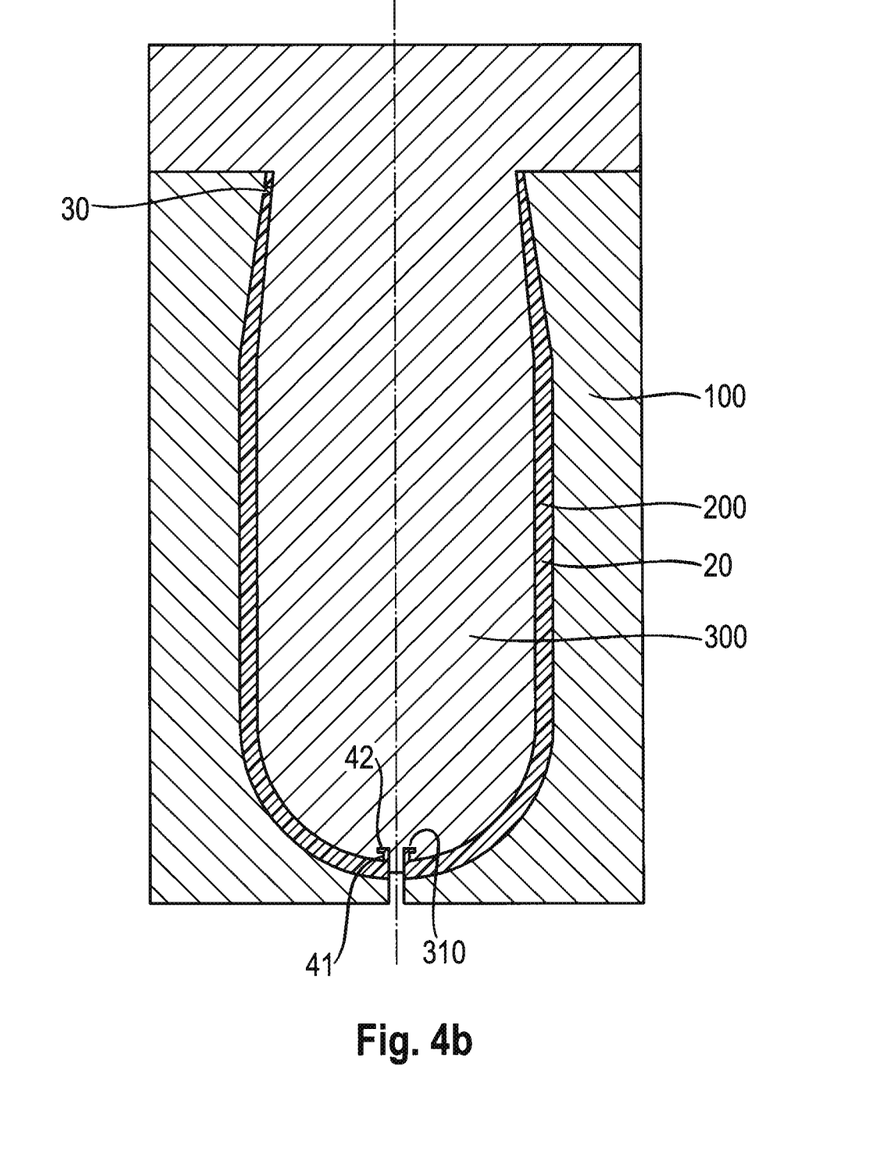
FIG. 4b shows an outer-layer (20), formed by injecting a resin into the first cavity (200). The preform mould is so formed as to form a vent (30). The interlock stem (41) and interlock head (42) is formed by the injection of resin into the interlock mould portion (310). The injection point for the resin is not shown, but can be placed in any suitable position.
Figure 5A:
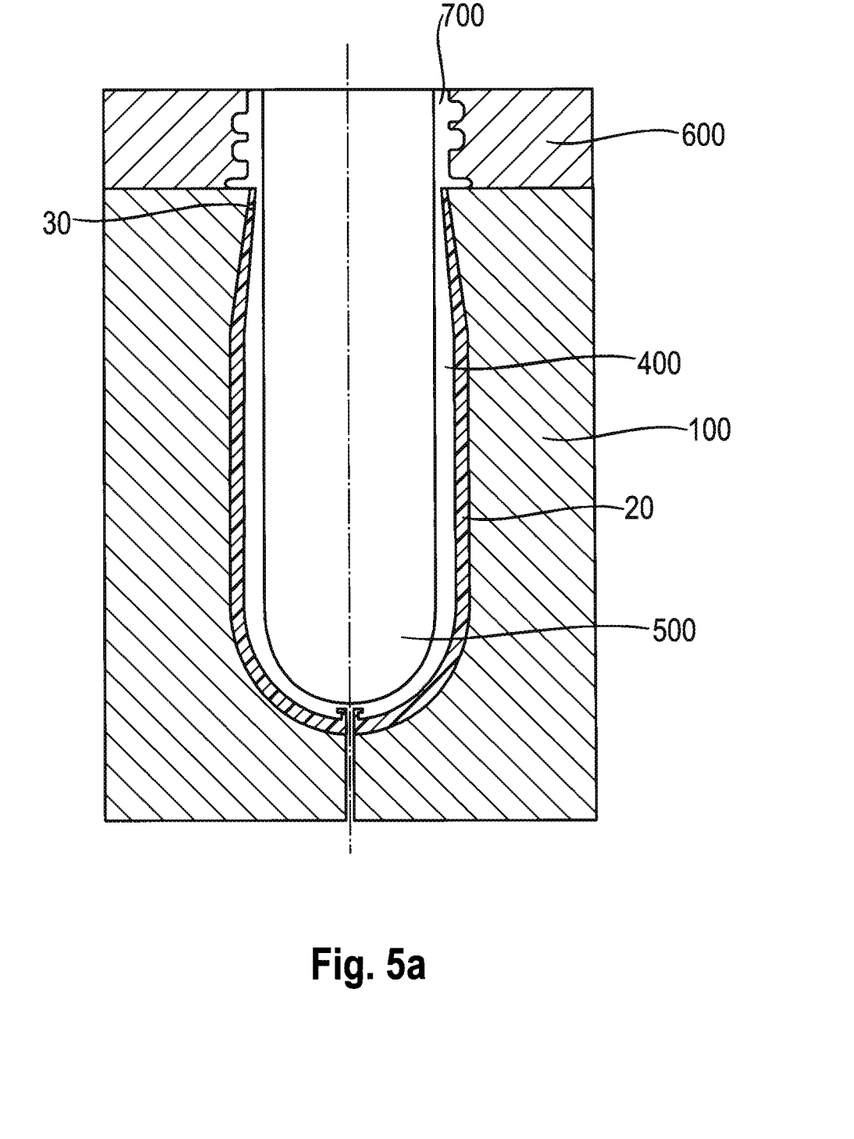
FIG. 5a shows a second cavity formed in the space between a second core (500) and the outer layer (20). A neck insert (600) and the top portion of the second core (500) provides a neck cavity (700).
Figure 5B:
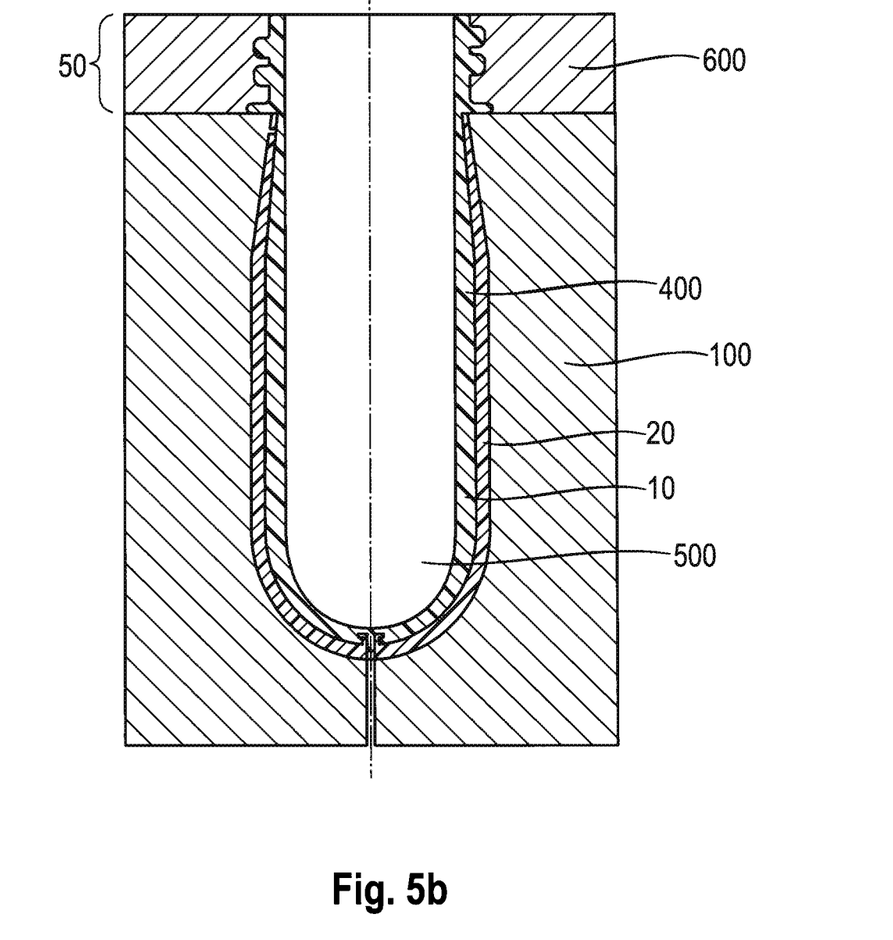
FIG. 5b shows an inner-layer (10) formed by injecting a resin into the first cavity (200), and a preform neck (50) formed by injecting a resin into the neck cavity (700). The interlock (40) is completed by injecting the resin of the inner layer (10) around the interlock stem (41) and head (42).

The application of a release agent is particularly beneficial with respect to the design of the inner layer. Indeed, lowering the interferential adhesive strength facilitates the lamination of the inner layer from the outer layer and hence reduces stress exerted on the inner layer upon delamination. As such the inner layer can be designed very thin and flexible without risking that the inner layer is damaged upon delamination. Clearly, the flexibility of the inner bag is a key parameter for the liquid dispensing and moreover material savings can be achieved when the inner layer can be designed very thin, and also when the neck (50) is made of the same material as the inner layer (10) (see FIG. 1).

The container (10) can be made by blow-moulding a preform (1) of the present invention. The various methods of blow moulding are well known. Injection blow-moulding (IBM) and its variant, injection stretch blow-moulding (ISBM), are commonly used to manufacture high quality hollow articles, such as bottles, on an industrial scale. By "stretch-blow moulding", what is meant herein is the process in which preforms are heated above their glass transition temperature, and then blown in moulds using high pressure air to form hollow bodies, such as containers or bottles. Usually the preform is stretched with a core rod as part of the process.

Glass transition temperature and melt temperature may be conveniently measured with reference to ASTM D3418.

The process of the present invention comprises the following steps:

a) providing a preform (1) according to the present invention, or formed from the processes described herein, into a container mould cavity;
b) stretch blow moulding the preform (1) to form a container;
c) ejecting the finished container from the container mould cavity.

The preform (1) is typically heated above the glass transition temperature of the inner layer (10) and outer layer (20), before stretch-blow moulding, either before placement into the container mould cavity, or while the preform (1) is in the container mould cavity.

Stretch blow moulding is typically done via injection stretch-blow moulding or reheat stretch-blow moulding where in the latter injection and stretch-blow moulding is done on two separate machines. More information on injection blow-moulding processes can be obtained from general textbooks, for example "The Wiley Encyclopaedia of Packaging Technology", Second Edition (1997), published by Wiley-Interscience Publication (in particular see page 87-89).

The resulting blown container (10) typically has a neck (50), having the same finish with outer threads and other features which may be present on the preform neck (50), such as a lowermost neck flange, snap fit bayonet, and the like. The remainder of the bottle undergoes expansion, although to varying degrees, until the container is formed and ejected from the mould.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:
1. A preform (1) comprising:
a) a preform neck (50);
b) a preform body (60) extending from the neck; and
c) a preform end cap (70) extending from the preform body;
wherein the body (60) and end cap (70) comprise:
   i. an inner layer (10) comprising an inner layer inner surface (11) and an inner layer outer surface (12);
   ii. an outer layer (20) comprising an outer layer inner surface (21) and an outer layer outer surface (22);
wherein the inner layer (10) is positioned interior to the outer layer (20),
   characterised in that outer layer (20) in the end cap (70) comprises an interlock (40), wherein the interlock (40) comprises a stem (41) and a head (42) extending from the stem, the interlock (40) being connected to the outer layer inner surface (21) by the stem (41), such that the inner layer (10) and outer layer (20) are connected in the end cap (70) by the interlock (40); and
   wherein at least part of said stem (41) and head (42) of said interlock (40) are fixed into the inner layer (10) so that said interlock (40) is pointed towards said inner layer inner surface (11).
2. The preform (1) according to claim 1, further comprising a vent (30).
3. The preform (1) according to claim 2, wherein the vent (30) is positioned closer to the preform neck (50) than the preform end cap (70).

4. The preform (1) according to claim 3, wherein the vent is positioned from about 0 mm to about 25 mm, below the neck (50).

5. A process for making the preform (1) comprising
   a) a preform neck (50);
   b) a preform body (60) extending from the neck; and
   c) a preform end cap (70) extending from the preform body;
      wherein the body (60) and end cap (70) comprise:
      i. an inner layer (10) comprising an inner layer inner surface (11) and an inner layer outer surface (12);
      ii. an outer layer (20) comprising an outer layer inner surface (21) and an outer layer outer surface (22);
      wherein the inner layer (10) is positioned interior to the outer layer (20),
   characterised in that outer layer (20) in the end cap (70) comprises an interlock (40), wherein the interlock (40) comprises a stem (41) and a head (42) extending from the stem, the interlock (40) being connected to the outer layer inner surface (21) by the stem (41), such that the inner layer (10) and outer layer (20) are connected in the end cap (70) by the interlock (40); and wherein at least part of said stem (41) and head (42) of said interlock (40) are fixed into the inner layer (10) so that said interlock (40) is pointed towards said inner layer inner surface (11); wherein the process comprises
   wherein the process comprises the steps of:
      a) forming a first cavity (200) between a preform mould (100) and a first core (300), wherein the first core (300) comprises the interlock mould-portion (310);
      b) injecting a resin into the first cavity (200) to form the outer layer (20) and the interlock stem (41) and head (42);
      c) leaving the outer layer (20) and stem (41) and head (42) in the preform mould (100), while replacing the first core (300) with a second core (500), to form a second cavity (400) between the outer layer (20) and the second core (500);
      d) injecting resin into the second cavity (400) to form the inner layer (10) and form the interlock (40);
   wherein the preform neck (50) is formed by providing a neck cavity (700) between a preform insert (600) and either the first core (300) or second core (500).

6. The process according to claim 5, wherein the interlock mould-portion (310) comprises a means for de-moulding the stem (41) and head (42).

7. The process according to claim 6, wherein the means for de-moulding the stem (41) and head (42) comprises a collapsible core.

8. The process according to claim 5, wherein the inner layer and outer layer comprise a resin, wherein the resin used to form the inner layer (10) and outer layer (20) independently comprises a thermoplastic material selected from the group consisting of: polyethylene, polypropylene, polyethylene furanoate (PEF), thermoplastic elastomers from polyolefin blends, polyethylene terephthalate (PET), polyethylene naphthalate (PEN), polytrimethylene terephthalate (PTT), poly(trimethylene naphthalate) (PTN), polyglycol acetate (PGAc), polylactic acid (PLA), and mixtures thereof.

9. The process according to claim 8, wherein:
   a) the resin used to form the inner layer (10) comprises a thermoplastic material selected from the group consisting of: polyethylene, low-density polyethylene, high-density polyethylene, polypropylene, and mixtures thereof; and
   b) the resin used to form the outer layer (20) comprises a thermoplastic material selected from the group consisting of: polypropylene, polyethylene terephthalate (PET), and mixtures thereof.

10. The process according to claim 8, wherein at least one of the resins used to form the inner layer (10) and the outer layer (20) comprise a release agent.

11. A process for making a container, comprising the steps of:
    a) providing a preform (1) formed from the process of claim 5, into a container mould cavity;
    b) stretch blow moulding the preform (1) to form a container;
    c) ejecting the container from the container mould cavity, wherein the preform (1) is heated before stretch blow moulding.

12. The process according to claim 11, wherein no heat shielding or active cooling is applied to the end cap (70).

13. A container (2) comprising:
    a) a container neck (150);
    b) a container body (160) extending from the container neck; and
    c) a container end cap (170) extending from the container body;
       wherein the container body (160) and container end cap (170) comprise:
       i. an inner layer (110) comprising an inner layer inner surface (111) and an inner layer outer surface (112);
       ii. an outer layer (220) comprising an outer layer inner surface (221) and an outer layer outer surface (222);
       wherein the inner layer (110) is positioned interior to the outer layer (220),
    characterised in that outer layer (220) in the end cap (170) comprises an interlock (40), wherein the interlock (40) comprises a stem (41) and a head (42) extending from the stem, the interlock (40) being connected to the outer layer inner surface (21) by the stem (41), such that the inner layer (110) and outer layer (220) are connected in the end cap (170) by the interlock (40); and wherein at least part of said stem (41) and head (42) of said interlock (40) are fixed into the inner layer (110) so that said interlock (40) is pointed towards said inner layer inner surface (111).

\* \* \* \* \*